(12) United States Patent
Wang et al.

(10) Patent No.: US 12,323,034 B2
(45) Date of Patent: Jun. 3, 2025

(54) ENERGY STORAGE FLYWHEEL AND ENERGY STORAGE APPARATUS

(71) Applicant: Huachi Kinetic Energy (Beijing) Technology Co., Ltd, Beijing (CN)

(72) Inventors: Zhiqiang Wang, Beijing (CN); Sen Su, Beijing (CN)

(73) Assignee: HUACHI KINETIC ENERGY (BEIJING) TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/254,541

(22) PCT Filed: Jan. 17, 2023

(86) PCT No.: PCT/CN2023/072578
§ 371 (c)(1),
(2) Date: May 25, 2023

(87) PCT Pub. No.: WO2023/138569
PCT Pub. Date: Jul. 27, 2023

(65) Prior Publication Data
US 2024/0372433 A1    Nov. 7, 2024

(30) Foreign Application Priority Data
Jan. 18, 2022   (CN) .......................... 202210056345.3

(51) Int. Cl.
*H02K 7/02*    (2006.01)
*H02K 7/04*    (2006.01)
*H02K 7/09*    (2006.01)

(52) U.S. Cl.
CPC ............... *H02K 7/025* (2013.01); *H02K 7/04* (2013.01); *H02K 7/09* (2013.01)

(58) Field of Classification Search
CPC ............ H02K 7/02; H02K 7/025; H02K 7/04; H02K 7/09; H02K 2201/12; Y02E 60/16;
(Continued)

(56) References Cited

U.S. PATENT DOCUMENTS 4,320,927 A * 3/1982 Sertich ............... F16C 32/0429
384/100
4,379,598 A * 4/1983 Goldowsky ......... F16C 32/0429
310/90.5
(Continued)

FOREIGN PATENT DOCUMENTS

CN      209200844      8/2019
CN      113489231      10/2021

OTHER PUBLICATIONS

Zhao Young et al. ; CN 109301982 (Year: 2019).*
Liu Qiang ; CN 106286594 (Year: 2017).*
Yan Jian; CN 113489231 (Year: 2021).*

*Primary Examiner* — Ahmed Elnakib
(74) *Attorney, Agent, or Firm* — Hodgson Russ LLP

(57) ABSTRACT

An energy storage flywheel includes a housing; a flywheel rotor arranged in the housing and connected, at an upper end, to a self-bearing motor; a bearing rotor fitted over a lower end of the flywheel rotor and provided, at a lower end, with an annular rotor magnetic steel; and a bearing stator a arranged below the bearing rotor and provided with a cavity which opens towards the bearing rotor, in which the lower end of the bearing rotor is fitted, and at a circumferential surface of which is provided with an annular stator magnetic steel. At least part of the annular stator magnetic steel is opposite to and below the annular rotor magnetic steel in an up-and-down direction and is opposite to the annular rotor magnetic steel in a radial direction of the bearing rotor; and the annular stator magnetic steel and the annular rotor magnetic steel repel each other.

9 Claims, 1 Drawing Sheet

(58) Field of Classification Search
CPC .. Y02T 10/64; F16F 15/30; B64G 1/28; H02J 3/30; H02J 15/00; H02J 9/00; F16C 32/0429; F16C 32/0408; F16C 32/041; F16C 32/0412; F16C 32/0414; F16C 32/0419; F16C 32/0421; F16C 32/0423; F16C 32/0425; F16C 32/0427
USPC .................................................... 310/74, 153
See application file for complete search history.

(56) References Cited

U.S. PATENT DOCUMENTS

| | | | | |
|---|---|---|---|---|
| 4,444,444 | A * | 4/1984 | Benedetti ................. | H02K 7/09 310/90.5 |
| 4,617,507 | A * | 10/1986 | Eisenhaure ............ | H02K 7/025 322/DIG. 5 |
| 4,870,310 | A * | 9/1989 | Triplett ............... | F16C 32/0444 310/74 |
| 5,124,605 | A * | 6/1992 | Bitterly ................. | F16F 15/305 310/90.5 |
| 6,624,542 | B1 * | 9/2003 | Gabrys ................. | F16C 37/005 310/74 |
| 6,703,735 | B1 * | 3/2004 | Gabrys ............... | F16C 32/0476 310/90 |
| 2009/0058335 | A1 * | 3/2009 | Kascak ............... | H02P 21/0003 310/90.5 |
| 2014/0084756 | A1 * | 3/2014 | Kalev .................... | H02K 15/38 310/67 R |
| 2018/0366950 | A1 * | 12/2018 | Pedersen ................. | F02D 19/06 |

* cited by examiner

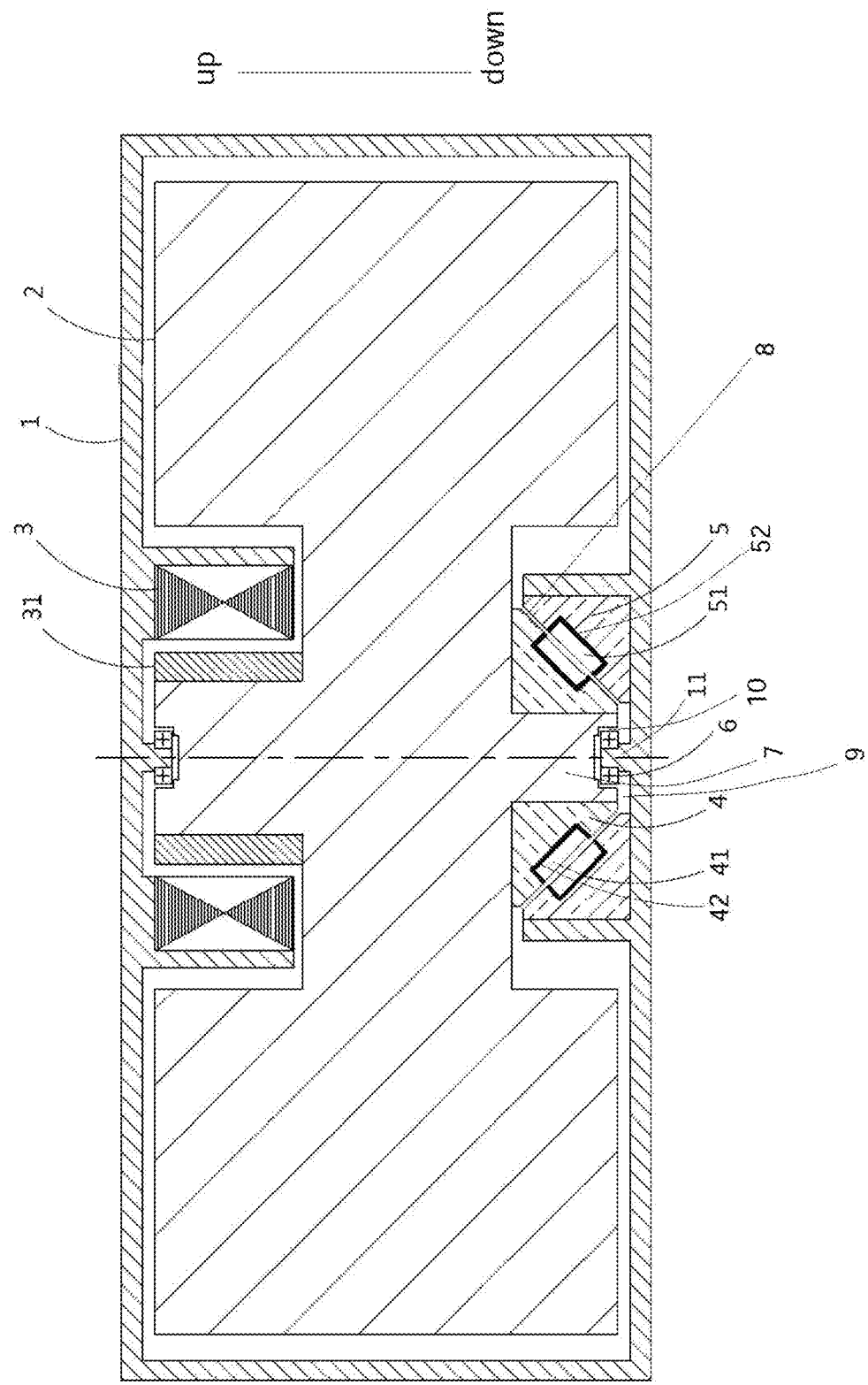

ENERGY STORAGE FLYWHEEL AND ENERGY STORAGE APPARATUS

CROSS-REFERENCE TO RELATED APPLICATIONS

This application is a U.S. national phase entry of International Application No. PCT/CN2023/072578, filed on Jan. 17, 2023, which claims priority to Chinese Patent Application No. 202210056345.3, filed on Jan. 18, 2022, the entire disclosures of which are incorporated herein by reference.

FIELD

The present disclosure relates to the field of a flywheel energy storage technology, and in particular to an energy storage flywheel and an energy storage apparatus including the same.

BACKGROUND

A flywheel energy storage system is an energy-efficient inertia-based energy storage device which stores energy by means of a flywheel rotating at ultra-high speed and achieves mutual conversion between mechanical and electrical energy through an electromechanical energy conversion device. Based on characteristics of a high specific energy, a high specific power, a high conversion efficiency between electrical and mechanical energy, an ability to charge quickly, maintenance-free and a good performance-to-price ratio, the flywheel energy storage system is widely promising in the fields of electric vehicles, aerospace, power grid peaking, uninterrupted power supply of wind power generation systems and the military. However, the energy storage flywheel in the related art is of an unreasonable structure, resulting in a low energy storage density, a large number of components and a high cost.

SUMMARY

The present disclosure aims to solve at least one of the technical problems in the related art to a certain extent.

In view of the above, the present disclosure provides in embodiments an energy storage flywheel assembled with less number of bearings, leading to a sufficient effective assembled space, a high energy storage density and a low cost.

The present disclosure further provides in embodiments an energy storage apparatus.

In an aspect, there is provided in embodiments an energy storage flywheel, including:
a housing;
a flywheel rotor, arranged in the housing in an up-and-down direction and rotatable relative to the housing;
a self-bearing motor, arranged in the housing, connected to the housing, and provided with a motor rotor connected to an upper end of the flywheel rotor;
a bearing rotor,
 fitting over a lower end of a shaft portion, and
 provided, at a lower end, with an annular rotor magnetic steel extending along a circumferential direction of the bearing rotor; and
a bearing stator, arranged below the bearing rotor, connected to the housing, and provided with a cavity which opens towards the bearing rotor,
 in which the lower end of the bearing rotor is fit, and
 at a circumferential surface of which is provided with an annular stator magnetic steel extending along the circumferential direction of the bearing stator,
wherein
 at least part of the annular stator magnetic steel is opposite to the annular rotor magnetic steel in the up-and-down direction and below the annular rotor magnetic steel;
 at least part of the annular stator magnetic steel is opposite to the annular rotor magnetic steel in a radial direction of the bearing rotor; and
 the annular stator magnetic steel and the annular rotor magnetic steel repel each other.

According to an embodiment of the present disclosure, the energy storage flywheel includes the bearing rotor fitting over the lower end of a shaft portion, and the bearing stator connected to an inner bottom wall of the housing and arranged below the bearing stator, where the bearing rotor is provided with the annular rotor magnetic steel; the bearing stator is provided with the annular stator magnetic steel; at least part of the annular stator magnetic steel is opposite to the annular rotor magnetic steel in the up-and-down direction; and at least part of the annular stator magnetic steel is opposite to the annular rotor magnetic steel in the radial direction of the bearing rotor. Accordingly, a magnetic repulsive force is generated between the annular stator magnetic steel and the annular rotor magnetic steel both in the up-and-down direction to balance gravities of the flywheel rotor and the bearing rotor and in the radial direction of the bearing rotor for relative balance, such that the bearing rotor and the bearing stator provided with respective magnetic steels in the embodiment of the present disclosure function as a radial magnetic bearing and an axial magnetic bearing separately arranged as in the related art, allowing for less number of bearings required for the energy storage flywheel, thus leading to low cost, convenient assembly/disassembly, and less space occupation by the bearings for a large effective assembled space and thus a large energy storage density of the energy storage flywheel. Besides, in an embodiment of the present disclosure, the energy storage flywheel includes the self-bearing motor, thus further reducing the number of bearings and optimizing the structure of the energy storage flywheel.

In an embodiment, the annular rotor magnetic steel inclines and extends inwardly from top to bottom; the annular stator magnetic steel inclines and extends inwardly from top to bottom; and the annular rotor magnetic steel is arranged above the annular stator magnetic steel.

In an embodiment, a magnetic repulsive force is generated between the annular stator magnetic steel and the annular rotor magnetic steel towards an oblique upward direction; the magnetic repulsive force is of a vertical component force to balance gravity and a horizontal component force to balance the flywheel rotor in the radial direction.

In an embodiment, the bearing rotor has a conical segment at the lower end thereof which is fit in the cavity;
 the conical segment is of an outer circumferential surface inclining and extending inwardly from top to bottom;
 the circumferential surface of the cavity inclines and extends inwardly from top to bottom;
 the outer circumferential surface of the conical segment is opposite to and spaced apart from the circumferential surface of the cavity in a first direction;
 the first direction is perpendicular to the outer circumferential surface of the conical segment;

the annular rotor magnetic steel is arranged at the outer circumferential surface of the conical segment; and the annular stator magnetic steel is arranged at the circumferential surface of the cavity.

In an embodiment, the annular rotor magnetic steel is directly opposite to the annular stator magnetic steel in the first direction.

In an embodiment, the conical segment is provided, at the outer circumferential surface, with a first annular fitting groove extending along a circumferential direction of the conical segment;

the annular rotor magnetic steel is fit in the first annular fitting groove;

the cavity is provided, at the circumferential surface, with a second annular fitting groove extending along a circumferential direction of the cavity; and the annular stator magnetic steel is fit in the second annular fitting groove.

In an embodiment, the energy storage flywheel further includes a stator magnetic steel sleeve and a rotor magnetic steel sleeve, wherein the rotor magnetic steel sleeve extends along the circumferential direction of the bearing rotor and is fit in the first annular fitting groove;

the annular rotor magnetic steel is fit in the rotor magnetic steel sleeve; and the stator magnetic steel sleeve extends along the circumferential direction of the bearing rotor and is fit in the second annular fitting groove.

In an embodiment, the energy storage flywheel further includes a rotor pressure ring and a stator pressure ring, wherein the rotor pressure ring is detachably connected to the conical segment;

the rotor pressure ring is capable of stopping the rotor magnetic steel sleeve to compress the rotor magnetic steel sleeve tightly;

the stator pressure ring is detachably connected to the bearing stator; and the stator pressure ring is capable of stopping the stator magnetic steel sleeve to compress the stator magnetic steel sleeve tightly.

In an embodiment, the rotor pressure ring is arranged at a bottom portion of the conical segment and adapted to prevent the annular rotor magnetic steel from wobbling; and the stator pressure ring is arranged at a top portion of the bearing stator and adapted to prevent the annular stator magnetic steel from wobbling.

In an embodiment, the energy storage flywheel further includes a protective bearing, which is arranged at one or both of an inner top wall and an inner bottom wall of the housing;

arranged coaxially with the flywheel rotor and rotatable relative to the housing; and capable of stopping the flywheel rotor in a radial direction of the flywheel rotor.

In an embodiment, the cavity is provided with a first opening and a second opening opposite to each other in the up-and-down direction;

the bearing rotor is fit in the cavity through the first opening;

the housing is provided, at the inner bottom wall, with a boss projecting towards the flywheel rotor;

the flywheel rotor is provided, at a lower end surface, with a limiting groove recessing upwardly;

an upper end of the boss extends into the cavity through the second opening and is fit in the limiting groove; and the protective bearing fits over the upper end of the boss and is spaced apart from an inner surface of the limiting groove in the radial direction of the flywheel rotor.

In an embodiment, the limiting groove is of a radial dimension smaller than that of the flywheel rotor.

In another aspect, there is provided in an embodiment an energy storage apparatus including an energy storage flywheel according to any of above embodiments.

According to embodiments of the present disclosure, the energy storage apparatus including the above energy storage flywheel is simple in structure and low in cost.

BRIEF DESCRIPTION OF THE DRAWINGS

FIG. 1 is a schematic diagram showing a structure of an energy storage flywheel in an embodiment of the present disclosure.

REFERENCE SIGNS a housing 1, a boss 11, a flywheel rotor 2, a self-bearing motor 3, a motor rotor 31, a bearing rotor 4, an annular rotor magnetic steel 41, a rotor magnetic steel sleeve 42, a bearing stator 5, an annular stator magnetic steel 51, a stator magnetic steel sleeve 52, a protective bearing 6, a shaft portion 7, a first opening 8, a second opening 9, a limiting groove 10.

DETAILED DESCRIPTION

The embodiments of the present disclosure are described in detail below, and examples of the embodiments are shown in the accompanying drawings. The embodiments described below with reference to the accompanying drawings are illustrative and are intended to explain the present disclosure, but cannot be understood as limiting the present disclosure.

As shown in FIG. 1, in an embodiment of the present disclosure, the energy storage flywheel includes a housing 1, a flywheel rotor 2, a self-bearing motor 3, a bearing rotor 4 and a bearing stator 5.

As shown in FIG. 1, the flywheel rotor 2 is arranged in the housing 1 in an up-and-down direction and rotatable relative to the housing 1; and the self-bearing motor 3 is arranged in the housing 1 and provided with a motor rotor 31 connected to an upper end of the flywheel rotor 2. It would be appreciated that the self-bearing motor 3 drives the flywheel rotor 2 to rotate. In addition, the flywheel energy storage device in the related art includes both a motor and a magnetic bearing supporting the flywheel rotor 2 and a connecting end of the motor; while in the embodiment of the present disclosure, the energy storage flywheel includes the self-bearing motor 3 to replace the magnetic bearings, thereby reducing the number of components in the housing 1 and saving an occupied assembled space for the magnetic bearings.

Further, as shown in FIG. 1, the bearing rotor 4 fits over a lower end of a shaft portion 7, and is provided, at a lower end, with an annular rotor magnetic steel 41 extending along a circumferential direction of the bearing rotor 4; and the bearing stator 5 is arranged below the bearing rotor 4, connected to the housing 1, and provided with a cavity which opens towards the bearing rotor 4, in which the lower end of the bearing rotor 4 is fit, and at a circumferential surface of which is provided with an annular stator magnetic steel 51 extending along the circumferential direction of the bearing stator 5, where at least part of the annular stator magnetic steel 51 is opposite to and below the annular rotor magnetic steel 41 in the up-and-down direction; at least part of the annular stator magnetic steel 51 is opposite to the annular rotor magnetic steel 41 in a radial direction of the bearing rotor 4; and the annular rotor magnetic steel 41 and the annular stator magnetic steel 51 repel each other.

It would be appreciated that, with the flywheel rotor 2 arranged vertically, both the flywheel rotor 2 and the bearing rotor 4 each their own gravity, while a part of the annular stator magnetic steel 51 opposite to the annular rotor magnetic steel 41 in the up-and-down direction repels the annular rotor magnetic steel 41, to balance the gravities of the flywheel rotor 2 and the bearing rotor 4, so that the flywheel rotor 2 is balanced in an axial direction. That is to say, the bearing rotor 4 and the bearing stator 5 in the embodiments of the present disclosure function as an axial magnetic bearing.

Further, a part of the annular stator magnetic steel 51 opposite to the annular rotor magnetic steel 41 in a radial direction of the flywheel rotor 2 repels the annular rotor magnetic steel 41, to provide a relatively balanced magnetic force in a circumferential direction of the flywheel rotor 2 to support the flywheel rotor 2. It would be appreciated that the deflected flywheel rotor 2 during deflecting drives the bearing rotor 4 to deflect, with the magnetic repulsive force between the annular rotor magnetic steel 41 and the annular stator magnetic steel 51 increased in the deflected direction, thus preventing the flywheel rotor 2 from deflecting. That is to say the bearing rotor 4 and the bearing stator 5 in the embodiments of the present disclosure function as a radial magnetic bearing.

In the related art, an energy storage flywheel commonly used includes the radial magnetic bearing and the axial magnetic bearing separately arranged to support and balance the flywheel rotor 2 in the axial and radial directions respectively in practical use. However, the above approach requires a larger number of bearings, leading to large occupied assembled space, a high cost, and cumbersome processes for assembly. In addition, in an embodiment of the present disclosure, the magnetic repulsive force is generated between the magnetic steels instead of electromagnets where a control system is necessary, thus further reducing the cost.

In an embodiment of the present disclosure, the bearing rotor 4 is provided with the annular rotor magnetic steel 41, and the bearing stator 5 is provided with the annular stator magnetic steel 51. The magnetic repulsive force is generated between the annular rotor magnetic steel 41 and the annular stator magnetic steel 51 both in the up-and-down direction and in the radial direction. That is to say, the bearing rotor 4 and the bearing stator 5 in the embodiments of the present disclosure function as the radial magnetic bearing and the axial magnetic bearing both, thereby reducing the number of the bearings. In other words, in embodiments of the present disclosure, the energy storage flywheel includes only the bearing rotor 4 and the bearing stator 5 that also function as the radial magnetic bearing and the axial magnetic bearing.

According to an embodiment of the present disclosure, the energy storage flywheel includes the bearing rotor fitting over the lower end of a shaft portion, and the bearing stator connected to an inner bottom wall of the housing and arranged below the bearing stator, where the bearing rotor is provided with the annular rotor magnetic steel; the bearing stator is provided with the annular stator magnetic steel; at least part of the annular stator magnetic steel is opposite to the annular rotor magnetic steel in the up-and-down direction; and at least part of the annular stator magnetic steel is opposite to the annular rotor magnetic steel in the radial direction of the bearing rotor. Accordingly, the magnetic repulsive force is generated between the annular stator magnetic steel and the annular rotor magnetic steel both in the up-and-down direction to balance gravities of the flywheel rotor and the bearing rotor and in the radial direction of the bearing rotor for relative balance, such that the bearing rotor and the bearing stator provided with respective magnetic steels in the embodiment of the present disclosure function as the radial magnetic bearing and the axial magnetic bearing separately arranged as in the related art, allowing for less number of bearings required for the energy storage flywheel, thus leading to low cost, convenient assembly/disassembly, and less space occupation by the bearings for a large effective assembled space and thus a large energy storage density of the energy storage flywheel. Besides, in an embodiment of the present disclosure, the energy storage flywheel includes the self-bearing motor, thus further reducing the number of bearings and optimizing the structure of the energy storage flywheel.

In an embodiment, as shown in FIG. 1, the annular rotor magnetic steel 41 inclines and extends inwardly from top to bottom; the annular stator magnetic steel 51 inclines and extends inwardly from top to bottom; and the annular rotor magnetic steel 41 is arranged above the annular stator magnetic steel 51. Accordingly, the magnetic repulsive force is generated between the annular stator magnetic steel 51 and the annular rotor magnetic steel 41 towards an oblique upward direction; the magnetic repulsive force is of the vertical component force to balance gravity and the horizontal component force to balance the flywheel rotor in the radial direction.

Further, as shown in FIG. 1, the bearing rotor 4 is formed, at the lower end, as a conical segment fit in the cavity; the conical segment is of an outer circumferential surface inclining and extending inwardly from top to bottom; the circumferential surface of the cavity inclines and extends inwardly from top to bottom; the outer circumferential surface of the conical segment is opposite to and spaced apart from the circumferential surface of the cavity in a first direction; the first direction is perpendicular to the outer circumferential surface of the conical segment; the annular rotor magnetic steel 41 is arranged at the outer circumferential surface of the conical segment; and the annular stator magnetic steel 51 is arranged at the circumferential surface of the cavity.

In other words, the outer circumferential surface of the conical segment and the circumferential surface of the cavity are both inclining and opposing to each other, thereby facilitating the stable assembly of the annular rotor magnetic steel 41 and the annular stator magnetic steel 51 which are arranged obliquely.

In an embodiment, as shown in FIG. 1, the annular rotor magnetic steel 41 is directly opposite to the annular stator magnetic steel 51 in the first direction.

Further, the conical segment is provided, at the outer circumferential surface, with a first annular fitting groove extending along a circumferential direction of the conical segment; the annular rotor magnetic steel 41 is fit in the first annular fitting groove; the cavity is provided, at the circumferential surface, with a second annular fitting groove extending along a circumferential direction of the cavity; and the annular stator magnetic steel 51 is fit in the second annular fitting groove.

Further, the energy storage flywheel further includes a stator magnetic steel sleeve 52 and a rotor magnetic steel sleeve 42, where the rotor magnetic steel sleeve 42 extends along the circumferential direction of the bearing rotor 4 and is fit in the first annular fitting groove; the annular rotor magnetic steel 41 is fit in the rotor magnetic steel sleeve 42;

and the stator magnetic steel sleeve 52 extends along the circumferential direction of the bearing rotor 4 and is fit in the second annular fitting groove. Accordingly, the stator magnetic steel sleeve 52 and the rotor magnetic steel sleeve 42 conveniently accommodate the annular stator magnetic steel 51 and the annular rotor magnetic steel 41 respectively, thus facilitating assembly/disassembly of the magnetic steels as a whole. Besides, the fitting groove for accommodating the magnetic steel sleeve facilitates precise assembly of the magnetic steel sleeve without complex connections required, resulting in a simple structure.

Further, the energy storage flywheel further includes a rotor pressure ring (not shown) and a stator pressure ring (not shown), where the rotor pressure ring is detachably connected to the conical segment; the rotor pressure ring is capable of stopping the rotor magnetic steel sleeve 42 to compress the rotor magnetic steel sleeve 42 tightly; the stator pressure ring is detachably connected to the bearing stator 5; and the stator pressure ring is capable of stopping the stator magnetic steel sleeve 52 to compress the stator magnetic steel sleeve 52 tightly.

Further, the rotor pressure ring is arranged at a bottom portion of the conical segment and the stator pressure ring is arranged at a top portion of the bearing stator 5. Accordingly, the stator pressure ring is capable of preventing the annular stator magnetic steel 51 from wobbling and the rotor pressure ring is capable of preventing the annular rotor magnetic steel 41 from wobbling.

In an embodiment, as shown in FIG. 1, the energy storage flywheel further includes a protective bearing 6, which is arranged at one or both of the inner top wall and an inner bottom wall of the housing 1; arranged coaxially with the flywheel rotor 2 and rotatable relative to the housing 1; and capable of stopping the flywheel rotor 2 in the radial direction of the flywheel rotor 2. Accordingly, the protective bearing 6 serves as a mechanical bearing once the annular rotor magnetic steel 41 and the annular stator magnetic steel 51 fail, thereby maintaining the flywheel rotor 2 to rotate. In specific, when the flywheel rotor 2 is deflected in the radial direction, the protective bearing 6 is abut against the bearing rotor 4, and the bearing rotor 4 drives the protective bearing 6 to rotate together.

Further, as shown in FIG. 1, the cavity is provided with a first opening 8 and a second opening 9 opposite to each other in the up-and-down direction; the bearing rotor 4 is fit in the cavity through the first opening 8; the housing 1 is provided, at the inner bottom wall, with a boss 11 projecting towards the flywheel rotor 2; the flywheel rotor 2 is provided, at a lower end surface, with a limiting groove 10 recessing upwardly; an upper end of the boss 11 extends into the cavity through the second opening 9 and is fit in the limiting groove 10; and the protective bearing 6 fits over the upper end of the boss 11 and is spaced apart from an inner surface of the limiting groove 10 in the radial direction of the flywheel rotor 2.

In other words, the protective bearing 6 and the limiting groove 10 provide protection once failure occurs, where the protective bearing 6 is abut against the inner surface of the limiting groove 10 when the flywheel rotor 2 deflects, so that the boss 11 serves as a support shaft for the protective bearing 6 and the flywheel rotor 2 drives the protective bearing 6 to rotate around the boss 11.

It would be appreciated that the limiting groove 10 is of a radial dimension smaller than that of the flywheel rotor 2, thus allowing for a slow linear velocity at a surface of the flywheel rotor 2 contacting with the protective bearing 6 if fit in the limiting groove 10, as compared to arranging the protective bearing 6 outside the flywheel rotor 2, thus enabling the protective bearing 6 to rotate at a slow speed, protecting the protective bearing 6 from abrasion, thereby resulting in long service life.

In an embodiment of the present disclosure, there is provided an energy storage apparatus including the energy storage flywheel according to any of above embodiments.

According to embodiments of the present disclosure, the energy storage apparatus including the above energy storage flywheel is simple in structure and low in cost.

In the specification, it should be understood that, the terms indicating orientation or position relationship such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" or the like should be construed to refer to the orientation or position relationship as described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein for purposes of description and are not intended to indicate or imply relative importance or impliedly indicate quantity of the technical feature referred to. Thus, the feature defined with "first" and "second" may indicate or imply that at least one of this features. In the description of the present disclosure, "a plurality of" means two or more than two this features, such as two, three and the like, unless specified otherwise.

In the present disclosure, unless specified or limited otherwise, the terms "mounted", "connected", "coupled", "fixed" and the like are used broadly, and may be, for example, a fixed connection, a detachable connection, or an integrated connection; may be a mechanical connection, may also by an electrical connections or communicate with each other; may also be a direct connection or an indirect connection via an intervening structure; may also be an inner communication of two elements or a mutual interaction between two elements, which can be understood by those skilled in the art according to specific situations.

In the present disclosure, unless specified or limited otherwise, a structure in which a first feature is "on" or "below" a second feature may be an embodiment in which the first feature is in direct contact with the second feature, or an embodiment in which the first feature and the second feature are contacted indirectly via an intermediation. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features in different embodiments or examples as described in this specification may be combined by those skilled in the art, without conflicting with each other.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. An energy storage flywheel, comprising:
   a housing;
   a flywheel rotor, arranged in the housing in an up-and-down direction and rotatable relative to the housing;
   a self-bearing motor, arranged in the housing, connected to the housing, and provided with a motor rotor connected to an upper end of the flywheel rotor;
   a bearing rotor,
      fitting over a lower end of a shaft portion, and
      provided, at a lower end, with an annular rotor magnetic steel extending along a circumferential direction of the bearing rotor; and
   a bearing stator, arranged below the bearing rotor, connected to the housing, and provided with a cavity
      which opens towards the bearing rotor,
      in which the lower end of the bearing rotor is fit, and
      at a circumferential surface of which is provided with an annular stator magnetic steel extending along the circumferential direction of the bearing stator,
   wherein:
      at least part of the annular stator magnetic steel is opposite to the annular rotor magnetic steel in the up-and-down direction and below the annular rotor magnetic steel;
      at least part of the annular stator magnetic steel is opposite to the annular rotor magnetic steel in a radial direction of the bearing rotor; and
      the annular stator magnetic steel and the annular rotor magnetic steel repel each other,
   wherein the energy storage flywheel further comprises a protective bearing, which is
      arranged at one or both of an inner top wall and an inner bottom wall of the housing;
      arranged coaxially with the flywheel rotor and rotatable relative to the housing; and
      capable of stopping the flywheel rotor in a radial direction of the flywheel rotor,
   wherein:
      the cavity is provided with a first opening and a second opening opposite to each other in the up-and-down direction;
      the bearing rotor is fit in the cavity through the first opening;
      the housing is provided, at the inner bottom wall, with a boss projecting towards the flywheel rotor;
      the flywheel rotor is provided, at a lower end surface, with a limiting groove recessing upwardly;
      an upper end of the boss extends into the cavity through the second opening and is fit in the limiting groove; and
      the protective bearing fits over the upper end of the boss and is spaced apart from an inner surface of the limiting groove in the radial direction of the flywheel rotor.

2. The energy storage flywheel according to claim 1, wherein:
   the annular rotor magnetic steel inclines and extends inwardly from top to bottom;
   the annular stator magnetic steel inclines and extends inwardly from top to bottom; and
   the annular rotor magnetic steel is arranged above the annular stator magnetic steel.

3. The energy storage flywheel according to claim 2, wherein:
   a magnetic repulsive force is generated between the annular stator magnetic steel and the annular rotor magnetic steel towards an oblique upward direction; and
   the magnetic repulsive force is of a vertical component force to balance gravity and a horizontal component force to balance the flywheel rotor in the radial direction.

4. The energy storage flywheel according to claim 2, wherein:
   the bearing rotor has a conical segment at the lower end thereof which is fit in the cavity;
   the conical segment is of an outer circumferential surface inclining and extending inwardly from top to bottom;
   the circumferential surface of the cavity inclines and extends inwardly from top to bottom;
   the outer circumferential surface of the conical segment is opposite to and spaced apart from the circumferential surface of the cavity in a first direction;
   the first direction is perpendicular to the outer circumferential surface of the conical segment;
   the annular rotor magnetic steel is arranged at the outer circumferential surface of the conical segment; and
   the annular stator magnetic steel is arranged at the circumferential surface of the cavity.

5. The energy storage flywheel according to claim 4, wherein the annular rotor magnetic steel is directly opposite to the annular stator magnetic steel in the first direction.

6. The energy storage flywheel according to claim 4, wherein:
   the conical segment is provided, at the outer circumferential surface, with a first annular fitting groove extending along a circumferential direction of the conical segment;
   the annular rotor magnetic steel is fit in the first annular fitting groove;
   the cavity is provided, at the circumferential surface, with a second annular fitting groove extending along a circumferential direction of the cavity; and
   the annular stator magnetic steel is fit in the second annular fitting groove.

7. The energy storage flywheel according to claim 6, further comprising a stator magnetic steel sleeve and a rotor magnetic steel sleeve, wherein:
   the rotor magnetic steel sleeve extends along the circumferential direction of the bearing rotor and is fit in the first annular fitting groove;
   the annular rotor magnetic steel is fit in the rotor magnetic steel sleeve; and the stator magnetic steel sleeve extends along the circumferential direction of the bearing rotor and is fit in the second annular fitting groove.

8. The energy storage flywheel according to claim 1, wherein the limiting groove is of a radial dimension smaller than that of the flywheel rotor.

9. An energy storage apparatus, comprising the energy storage flywheel according to claim 1.

* * * * *